United States Patent
Peverada

(10) Patent No.: US 10,082,167 B2
(45) Date of Patent: Sep. 25, 2018

(54) CONNECTION DEVICE FOR TUBULAR ELEMENTS

(71) Applicant: Lino Peverada, Neyruz (CH)

(72) Inventor: Lino Peverada, Neyruz (CH)

( * ) Notice: Subject to any disclaimer, the term of this patent is extended or adjusted under 35 U.S.C. 154(b) by 44 days.

(21) Appl. No.: 15/311,071

(22) PCT Filed: May 13, 2015

(86) PCT No.: PCT/IB2015/053524
§ 371 (c)(1),
(2) Date: Nov. 14, 2016

(87) PCT Pub. No.: WO2015/173746
PCT Pub. Date: Nov. 19, 2015

(65) Prior Publication Data
US 2017/0082128 A1    Mar. 23, 2017

(30) Foreign Application Priority Data

May 15, 2014   (CH) .......................... 737/14

(51) Int. Cl.
*F16B 12/40*     (2006.01)
*F16B 2/04*      (2006.01)
*F16B 7/04*      (2006.01)

(52) U.S. Cl.
CPC ............ *F16B 12/40* (2013.01); *F16B 2/04* (2013.01); *F16B 7/0413* (2013.01); *F16B 2012/403* (2013.01)

(58) Field of Classification Search
CPC .......... F16B 7/04; F16B 7/0413; F16B 12/40; F16B 2012/403; Y10T 403/557
See application file for complete search history.

(56) References Cited

U.S. PATENT DOCUMENTS 2,290,430 A * 7/1942 Heiser .................... E06B 9/44
                                                    285/397
2,850,304 A * 9/1958 Wagner ................... E04G 7/20
                                                    256/65.15
(Continued)

FOREIGN PATENT DOCUMENTS

DE       20303508     5/2003
EP       29605722 U1 * 6/1996 .......... E04F 11/1836
(Continued)

OTHER PUBLICATIONS

International Search Report for PCT/IB2015/053524, English translation attached to original, Both completed by the European Patent Office dated Jul. 30, 2015, 5 Pages.

*Primary Examiner* — Daniel J Wiley
(74) *Attorney, Agent, or Firm* — Brooks Kushman P.C.

(57) ABSTRACT

An assembly of two profiled elements that each have a medial longitudinal edge and two longitudinal edges which are joined together by their medial edge and are kept movable apart from one another through a predefined limited travel. A cylindrical orifice passes perpendicularly through the medial longitudinal edge and a cylindrical element having dimensions that match the cylindrical orifice butts against the medial longitudinal edge such that the spacing of the medial edges causes the longitudinal edges to butt against the inner wall of the tubular element. A further embodiment is a connection kit for tubular elements and a tubular structure joined together by way of connection devices. The connection produced is either reversible or permanent.

16 Claims, 4 Drawing Sheets

(56) References Cited

U.S. PATENT DOCUMENTS

| | | | | | |
|---|---|---|---|---|---|
| 3,000,656 | A | * | 9/1961 | Hollaender | F16B 7/0413 403/292 |
| 3,484,830 | A | * | 12/1969 | Wagner | F16B 7/0413 285/397 |
| 3,514,135 | A | * | 5/1970 | Cooper | F16B 7/0413 285/370 |
| 3,606,408 | A | * | 9/1971 | Wagner | E04F 11/1817 285/397 |
| 4,236,846 | A | * | 12/1980 | Barton | F16B 7/044 403/298 |
| 4,570,408 | A | * | 2/1986 | Frascaroli | E04L 31/5831 403/176 |
| 4,859,109 | A | * | 8/1989 | Targetti | F16B 7/0413 403/297 |
| 6,216,413 | B1 | * | 4/2001 | Lapointe | G09F 7/18 248/548 |
| 8,128,519 | B1 | * | 3/2012 | Mahoney | A63B 63/004 473/478 |
| 8,333,531 | B1 | * | 12/2012 | Wei | A63B 21/1681 403/297 |
| 2007/0031187 | A1 | * | 2/2007 | McNeal | A47F 5/14 403/297 |
| 2007/0206989 | A1 | * | 9/2007 | Wagner | E04F 11/1836 403/297 |

FOREIGN PATENT DOCUMENTS

| | | |
|---|---|---|
| FR | 1562522 | 4/1969 |
| GB | 2256464 | 6/1991 |

\* cited by examiner

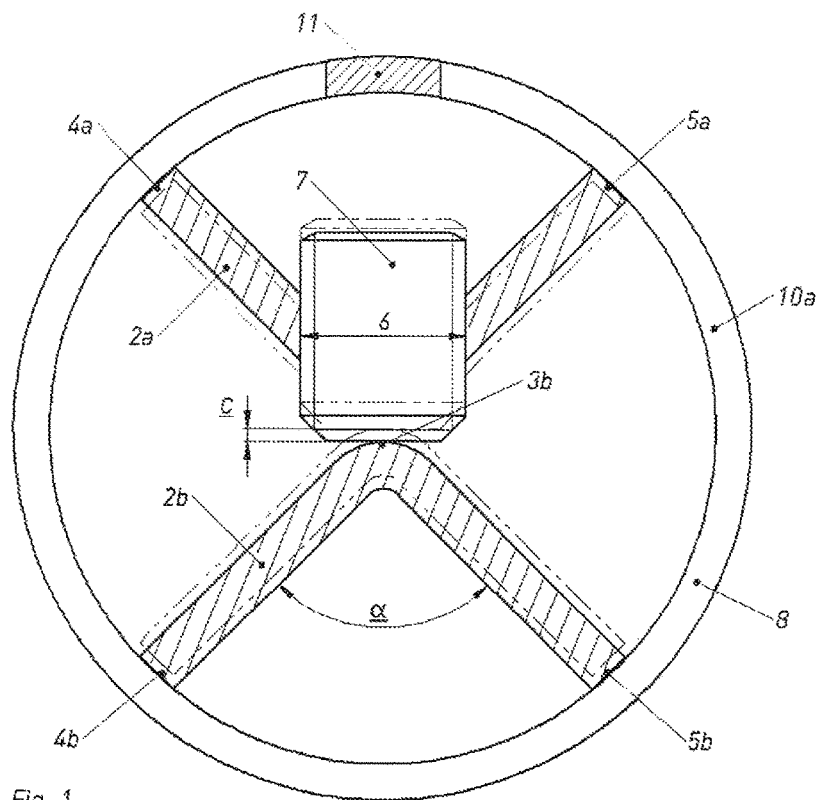
Fig. 1
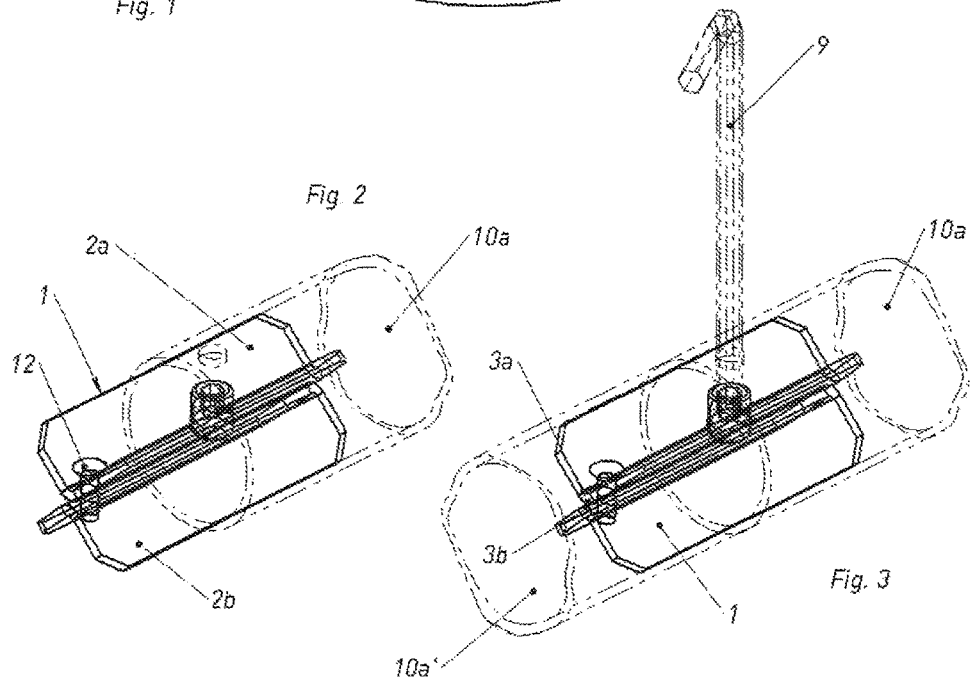
Fig. 2
Fig. 3

CONNECTION DEVICE FOR TUBULAR ELEMENTS

CROSS-REFERENCE TO RELATED APPLICATION

This application is the U.S. national phase of PCT Application No. PCT/IB2015/053524 filed on May 13, 2015, which claims priority to CH Patent Application No. 00737/14 filed on May 15, 2014, the disclosures of which are incorporated in their entirety by reference herein.

This invention relates to the field of tubular structures, both permanent and disconnectable, such as scaffolding, panel frames, frames for office furniture or various stands. More particularly, the invention relates to an internal connection device for tubular elements used, for example, in the above-mentioned context.

STATE OF THE ART/OUTLINE OF THE PROBLEM

The user, such as the installer of various tubular structures, already has a large number of connection systems. Tubes are usually assembled by linear connection (coaxial connection) or by means of angled pieces (planar connection) or corner pieces (three-dimensional connection); welding is not considered here since it is practically irreversible.

Assembly by the connection of tubular elements can be achieved by means of external connection devices such as flanges or rings or clips for example. A combination of male/female type screw, spring or ball connections, for example, is used, which therefore requires special machining of each of the ends to be connected. If the desired connection must be reversible, the separation of male/female type tubular elements is often awkward and a source of wear, breakage or distortion.

The assembly of tubular elements internally derives from the above-mentioned male/female concept: it is often required for aesthetic reasons (office furniture or industrial furniture for example) but also for safety reasons (scaffolding for example) and so any potentially dangerous roughness must be eliminated.

The invention proposes an internal connection device for tubular elements that is particularly simple and safe to use: it comprises a small number of constituent parts, the latter also being easy to make and available in a very wide range of variations (dimensions, material, shape, configuration, etc.). The invention thus enables the most complex assemblies to be created easily, while taking into account all of the mechanical constraints encountered in this context.

SUMMARY OF THE INVENTION

The first object of the invention is an assembly of two profiled elements each comprising a medial edge and two longitudinal edges, the profiled elements being joined together by their respective medial edge, and the medial edges being kept movably spaced apart from one another along a limited travel; at least one cylindrical orifice passing perpendicularly through one of the medial edges, and one cylindrical element having dimensions that match the cylindrical orifice and abutting against the opposite medial edge so that the space between said medial edges causes the longitudinal edges of said profiled elements to abut against the internal wall of the tubular element.

The invention also relates to a connection kit for tubular elements as well as a reversible or permanent tubular structure assembled by means of connection devices according to the invention. The invention is defined by claims 1 to 15.

DRAWINGS

FIG. 1 is a cross-sectional view of a connection device engaged in a cylindrical-section tubular element;

FIG. 2 is a perspective view of the device in FIG. 1 engaged only partly in the corresponding tubular element;

FIG. 3 is a perspective view of the device in FIG. 1 showing two cylindrical tubular elements connected by means of the device according to the invention;

DETAILED DESCRIPTION OF THE INVENTION

Figure 4:
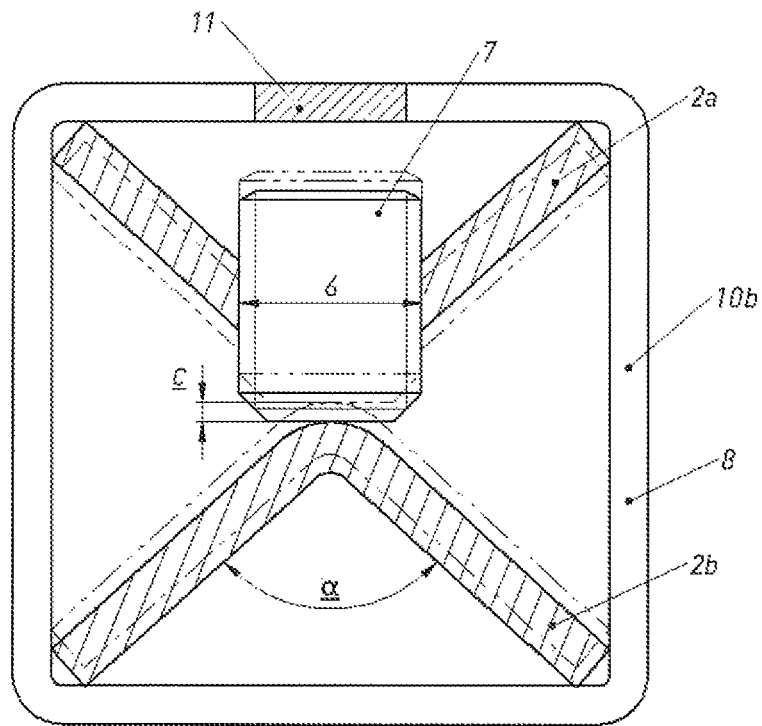
FIG. 4 is a cross-sectional view of the connection device engaged in a square-section tubular element.
Figure 5:
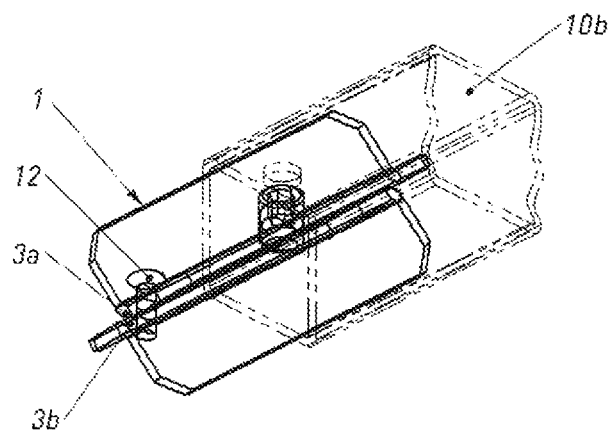
FIG. 5 is a perspective view of the device in FIG. 4 only partially engaged in the corresponding tubular element.
Figure 6:
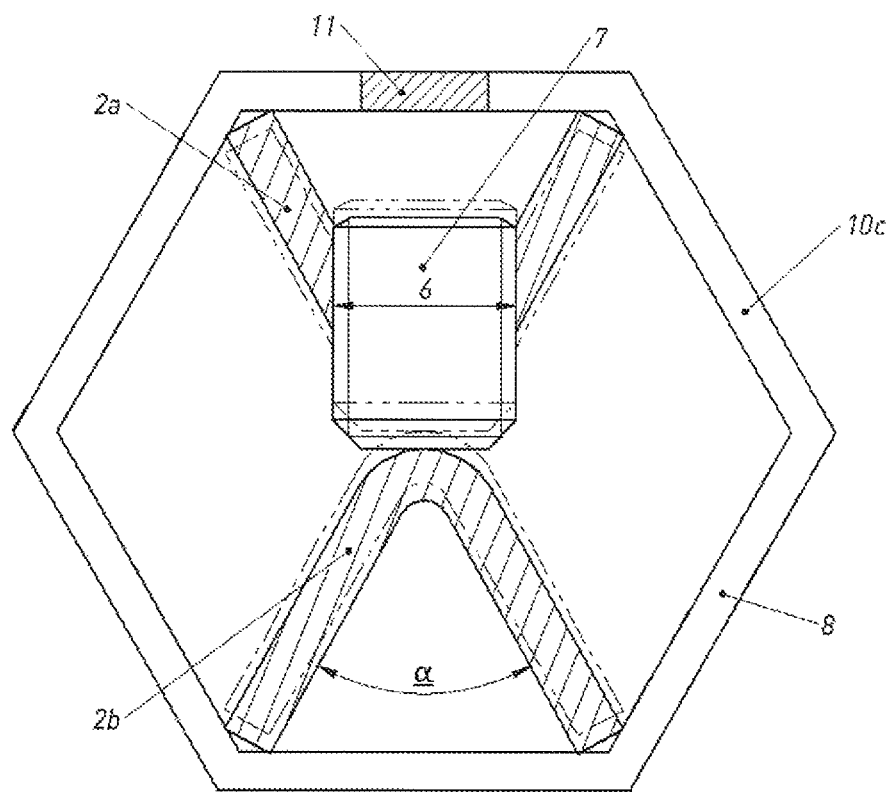
FIG. 6 is a cross-sectional view of the connection device engaged in a hexagonal-section tubular element.
Figure 7:
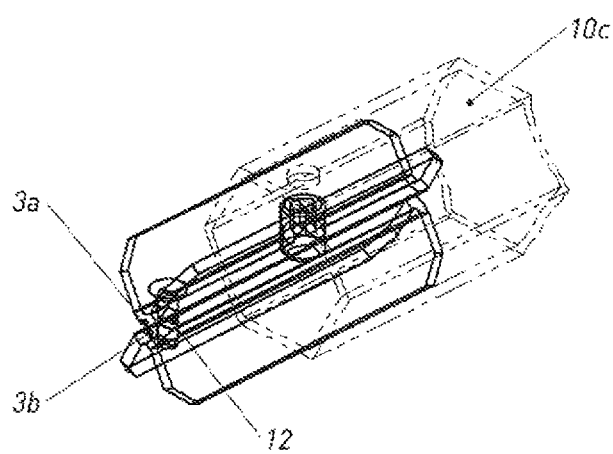
FIG. 7 is a perspective view of the device in FIG. 6 only partially engaged in the corresponding tubular element.

The first object of the invention is defined as a connection device 1 for tubular elements 10a, 10a', 10b, 10c, etc. comprising:

an assembly of two profiled elements 2a and 2b each comprising one medial edge 3a, 3b and two longitudinal edges 4a, 4b respectively 5a, 5b;

said first and second profiled elements 2a, 2b being joined together by their respective medial edge 3a, 3b and being kept movably spaced apart from one another along a limited travel C;

the first profiled element 2a comprising at least one cylindrical orifice 6 passing perpendicularly through said medial longitudinal edge 3a;

at least one cylindrical element 7, having dimensions that match the cylindrical orifice 6 and abutting against the medial edge 3b of the second profiled element 2b; and in which the portion of cylindrical element 7 protruding from the medial edge 3a of the first profiled element 2a and abutting on the medial edge 3b of the second profiled element 2b defines a spatial distance between said first and second profiled elements 2a, 2b so that the longitudinal edges 4a, 5a, respectively 4b, 5b, abut against the internal wall 8 of the tubular element 10a, 10a', 10b, 10c, etc.

Reading the above reveals that one of the special features of the device of the invention consists in creating the connection of the tubular elements 10a, 10a', 10b, 10c, etc. from the inside or, in other words, internally, the space between the profiled elements 2a and 2b being adjustable so that the pressure or friction required for the optimum fixing of the elements thus connected is exerted only on the internal wall 8 of said tubular elements 10a, 10a', 10b, 10c, etc. Such a connection has the advantage of leaving practically, if not absolutely, no roughness whatsoever, protruding beyond the external surface of said tubular elements.

Profiled element 2a, respectively 2b, can stand for an angled (angular), curved (e.g. parabolic) or semi-cylindrical profiled element. These configurations can be achieved by means of conventional techniques from a chosen material, such as by stamping a metal sheet such as a sheet of steel, stainless steel, aluminum or any other metal having the required mechanical properties: the extrusion of non-metallic composite materials such as polymers, for example, is also possible depending on the cases envisaged (mechanical stresses or weight of the assembly to be created).

Each of the profiled elements 2a and 2b is characterized by a medial edge or tangent 3a, respectively 3b, and two longitudinal edges or borders 4a and 5a, respectively 4b and 5b, by its length, by the height H of each of the lateral portions concerned and more particularly by the internal angle opening from the medial edge outwards (the internal angle of element 2b is shown as α in the Figures, whereas the internal angle of element 2a is not referenced).

The dimensions of the portions described above can vary from one element to the other; for example, depending on the configuration chosen, the internal angle of element 2a is identical to the internal angle α of element 2b or different therefrom. According to the invention, angle α is usually between 30 and 150°, more particularly between 60 and 120°, an angle α of 90° representing one of the preferred variations proposed in the context of the invention.

In the case of angled profiled elements, the notion of angle α is obvious as is the term "edge". The notion of angle is also understood by extension to convex or semi-cylindrical curved profiled elements; in this case, the term "tangent" is more appropriate than "medial edge".

Similarly, the length of each of the medial edges 3a and 3b or that of the longitudinal edges 4a, 5a, 4b, 5b is identical or varies in pairs or even individually; these variations in length have no determining effect on the efficiency of the connection made; a person skilled in the art is capable of choosing what is appropriate for each situation.

The height H of each of the longitudinal edges 4a, 5a, 4b and 5b can also vary regardless of each of the portions (flanks, flanges or sides) considered and the lateral branches of each element 2a and 2b can vary in height in pairs. These configurations are found for example when assembling multi-angle tubular elements that are square, rectangular, diamond-shaped, trapezoidal, hexagonal or even octagonal in section for example; said section can even be circular, oval or elliptical for example. Such tubular elements are in fact those available on the market.

The configurations in which the height H referred to above is identical for each of the side portions of 2a as well as 2b and in which the internal angles of elements 2a and 2b are also identical are shown in particular in FIGS. 1 to 7. Seen in cross-section, elements 2a and 2b are therefore identical, their assembly is symmetrical both before and after connection of the tubular elements 10a and 10a'; or 10b or 10c, and the distribution of the stresses against the internal wall 8 of said tubular elements is also symmetrical. This represents by far the most favourable configuration from a mechanical point of view.

According to the invention, the medial edge 3a of the element 2a comprises at least one cylindrical orifice 6 passing perpendicularly through it and arranged in the center of or elsewhere on said medial edge; at least one cylindrical element 7 has dimensions that match the cylindrical orifice 6, i.e. in diameter and length, in order to abut at the appropriate moment against the longitudinal medial edge 3b of the element 2b, so as to space the elements 2a and 2b apart from one another. The cylindrical element 7 can be a cylindrical element such as a pin, a dowel or, preferably, a threaded cylindrical element such as a screw or a bolt, in particular a slotted-head screw, a cross-head screw, socket-head cap screw, countersunk or otherwise; clearly, the cylindrical orifice 6 is then threaded. It is for a person skilled in the art to choose the most suitable tool.

Depending on the desired configuration or assembly or even depending on the mechanical stresses to be controlled, element 2a of the assembly 1 can comprise several orifices 6 arranged along the edge 3a at regular or irregular intervals.

An orifice 11 is formed in the wall of at least one of the two tubular elements that are to be fitted by means of the connection device of the invention. The orifice 11 is made near the end (terminal portion) of the tubular element. The orifice 11 is dimensioned so as to enable the operation of the tool 9 acting upon the element 7, a screw 7 for example (FIG. 3); in this latter case a conventional screwdriver, a Phillips screwdriver or a hexagonal-section key or a so-called "Allen" key is used. The orifice 11 can be a single circular perforation made in the required place or a longitudinal opening 11 enabling the fine adjustment of the relative position of the assembly 1 and the corresponding tubular element.

According to the invention, the profiled elements 2a and 2b are joined together by at least one of their respective ends by means of a connecting part 12 configured so as to allow a limited travel C defining the maximum distance that the medial edges 3a and 3b are apart. This connecting part can be a ring, a pin, a bolt with its nut or a rivet for example, any part that, passing through the medial edge 3a and 3b, is then dimensioned so as to limit the travel C. In the case of a bolt and its nut, the latter can be secured at a given point; in the case of a rivet, the matter is easily resolved by upsetting the head and tail. In the simplest configuration, elements 2a and 2b are free to rotate flat without restriction; when the elements 2a and 2b are joined a both ends of the medial edges 3a and 3b, only the controlled spacing of the latter is possible.

The maximum spacing C referred to above is relative and will vary depending on the dimension (e.g. diameter) of the tubular elements to be connected and on the dimensions chosen for elements 2a and 2b. The spacing C is usually only slightly greater than the distance required to immobilise the assembly 1 within the tubular element 10a, 10a', 10b, 10c, etc., in other words, so that the elements 2a and 2b lie flat against the wall 8 under the effect of the spacing between the medial edges 3a and 3b. This space is in the order of a mm, however, and it is for the person skilled in the art to choose the most suitable configuration.

The device also comprises, as an option, a compressible resilient element 13 with a maximum height (or diameter) H1 greater than the height H2 of a "triangle" whose apex coincides with the medial edge 3a of the element 2a and whose base is defined by the internal wall 8 of the tubular element. The resilient element is intended to be inserted in the internal angle of the profiled element 2a.

Figure 8:
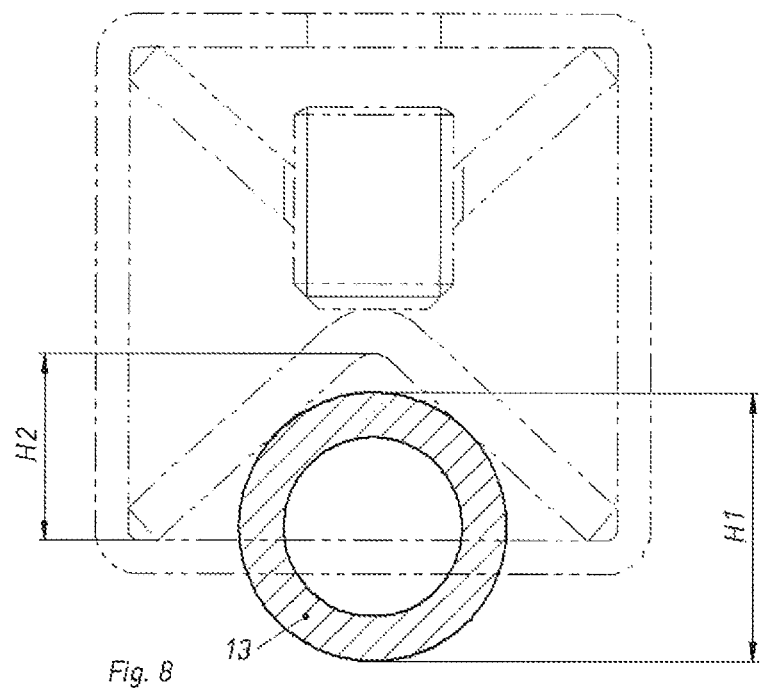
FIG. 8 shows the fitting of a compressible friction element before engaging the connection device in the corresponding tubular element.
Figure 9:
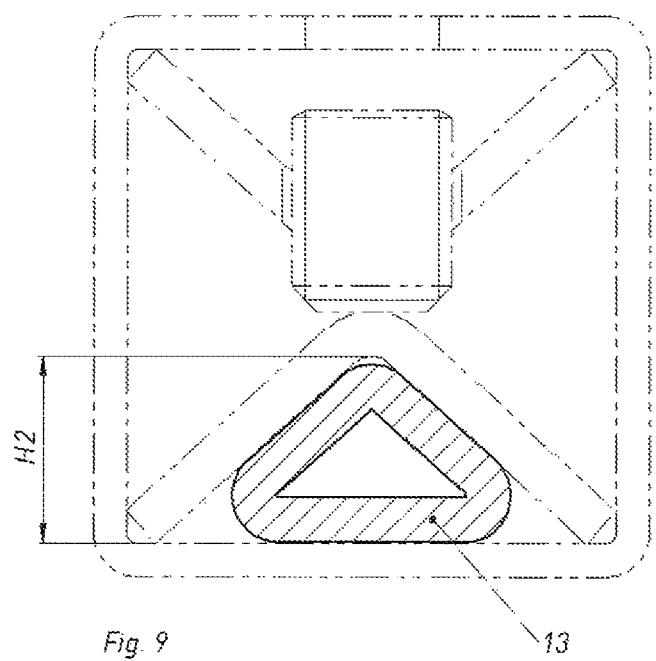
FIG. 9 shows the fitting of a compressible friction element after engaging the connection device in the corresponding tubular element.

In an equivalent manner, the compressible element 13 can be defined by its maximum height (or its diameter) H1 greater than the height H2 of a "triangle" whose apex coincides with the medial edge 3b of the element 2b and whose base is defined by the internal wall 8 of the tubular element; the resilient element then being intended to be inserted in the angle α of the profiled element 2b. This configuration is shown in FIGS. 8 and 9.

The element 13 is made of any resilient compressible material such as wood, cork, leather, rubber, a resilient polymer foam or a sufficiently resilient polymer. This element can also be hollow (FIGS. 8 and 9) or solid. It serves as a brake, in other words a means of friction, when introducing then fitting or adjusting the assembly 1 in the terminal portion of the corresponding tubular element.

The assembly of two tubular elements 10*a* and 10*a*', by means of the device of the invention, is briefly described below by way of example; it comprises the following steps:

a) inserting an assembly 1, comprising the first and second profiled elements 2*a* and 2*b*, into a terminal portion of a first tubular element 10*a*, the latter being provided with an orifice 11 located at a predetermined distance from the corresponding end of said tube 10*a*;

b) moving said assembly 1 forwards along a predetermined length so as to position the first profiled element 2*a*, comprising its threaded cylindrical orifice 6 and the threaded cylindrical element 7, in order to align it with the axis of the orifice 11 of the terminal portion of the tubular element 10*a*;

c) by doing this, the element 13 is gradually compressed as it advances into the above-mentioned terminal portion;

d) inserting the portion of the assembly 1 extending beyond the end of the first tubular element 10*a* into the terminal portion of a second tubular element 10*a*', the latter possibly being provided with an orifice for the tool 9; and e) actuating the threaded cylindrical element 7, through the orifice 11 of the terminal portion of the tube 10*a*, until it abuts on the medial edge 3*b* of the second profiled element 2*b*, thus resulting in the spatial distancing of the medial edges 3*a* and 3*b*, respectively the spatial distancing of the longitudinal edges 4*a*, 5*a* and 4*b*, 5*b* which thus abut against the internal wall 8 of the terminal portions of the tubular elements 10*a* and 10*a*'.

Such an assembly is both permanent and reversible. If the tubular elements 10*a* and 10*a*' previously connected as described above are required to be separated, simply perform the procedure in the reverse order.

The connection kits comprising the device according to the invention, like the various assemblies of tubular structures that can thus be created, will not however be described below as their variations are too numerous.

The invention claimed is:

1. A connection device for tubular elements comprising:
a first profiled element and a second profiled element each comprising one medial edge formed at the intersection of two lateral portions having two longitudinal edges;
the first and second profiled elements being joined together by their medial edges, at at least one of their respective ends, by means of a connecting part passing through the medial edges of both the first and second profiled elements and configured so as to limit the maximum travel distance between the medial edges;
the first profiled element comprising one threaded cylindrical orifice passing perpendicularly through the medial edge thereof;
a single threaded cylindrical element, having dimensions that match the threaded cylindrical orifice and arranged so as to extend beyond the medial edge of the first profiled element and abut against the medial edge of the second profiled element; and in which
the portion of the single threaded cylindrical element protruding from the medial edge of the first profiled element and abutting on the medial edge of the second profiled element defines a spatial distance between the first and second profiled elements such that their longitudinal edges abut against-internal walls of the tubular elements when coaxially connected together.

2. The device according to claim 1 wherein the profiled elements are of identical length.

3. The device according to claim 1 wherein the longitudinal edges of said profiled elements are of identical height.

4. The device according to claim 1 wherein an internal angle ($\alpha$) between the longitudinal edges and the medial edge of each of said profiled elements is between 60 and 120°.

5. The device according to claim 1 wherein an internal angle between the longitudinal edges and the medial edge of the first profiled element is identical to the internal angle ($\alpha$) of the second profiled element.

6. The device according to claim 1 wherein an internal angle ($\alpha$) between the longitudinal edges and the medial edge of each of said profiled elements is 90°.

7. The device according to claim 1 wherein the orifice is arranged in the center of the medial edge of the first profiled element.

8. The device according to claim 1 wherein the connection of the tubular elements is reversible.

9. A tubular structure comprising a first tubular element and a second tubular element, a terminal portion of the first tubular element and a terminal portion of the second tubular element being connected together by the connection device according to claim 1
one orifice being formed in the wall of the terminal portion of the first tubular element, the connection device being arranged to be inserted in the first tubular element so that the single threaded cylindrical element and the threaded cylindrical orifice of the first profiled element are positioned opposite the orifice formed in the wall of the terminal portion of the first tubular element;
one portion of the connection device protruding from the terminal portion of the first tubular element being inserted into the second tubular element; and
the threaded cylindrical element being arranged such as to keep the profiled elements spaced apart from one another so that the longitudinal edges are held flat against the internal wall of the first tubular element and against the internal wall of the second tubular element, the first and second tubular elements being thus connected to each other.

10. The tubular structure according to claim 9, characterized in that it is disconnectable.

11. A method for joining a first tubular element to a second tubular element using the connection device according to claim 9, the method comprising the following steps:
assembling the threaded cylindrical element with the connection device;
inserting the assembly of the connection device and the threaded cylindrical element into the terminal portion of the first tubular element, the orifice formed in the wall of the terminal portion of the first tubular element located at a predetermined distance from the end of the first tubular element;
moving the connection device forwards along a predetermined length so as to position the threaded cylindrical element and the threaded cylindrical orifice of the first profiled element opposite the orifice of the terminal portion of the first tubular element; a portion of the connection device comprising the connecting part then extending beyond the end of the first tubular element;

inserting the portion of the connection device extending beyond the end of the first tubular element into the terminal portion of a second tubular element; and actuating the threaded cylindrical element, through the orifice of the terminal portion of the first tubular element until it abuts on the medial edge of the second profiled element, thus resulting in the spatial distance between the first and the second profiled elements such that the longitudinal edges abut against the internal wall of the terminal portions of the first and second tubular elements.

12. The device according to claim 1 wherein the connection device comprises only one said threaded cylindrical element.

13. The device according to claim 1 wherein the tubular elements are in an annular shape.

14. The device according to claim 1 wherein the profiled elements are angled profiled elements.

15. A connection device for tubular elements comprising:
a first profiled element and a second profiled element, each comprising one medial edge and two longitudinal edges;
the first and second profiled elements being joined together by their medial edges, at at least one of their respective ends, by means of a connecting part passing through the medial edges of both the first and second profiled elements and configured so as to limit the maximum travel distance between the medial edges;
the first profiled element comprising one threaded cylindrical orifice passing perpendicularly through the medial edge thereof;
a single threaded cylindrical element, having dimensions that match the threaded cylindrical orifice and arranged so as to extend beyond the medial edge of the first profiled element and abut against the medial edge of the second profiled element; and in which
the portion of the single threaded cylindrical element protruding from the medial edge of the first profiled element and abutting on the medial edge of the second profiled element defines a spatial distance between the first and second profiled elements such that the longitudinal edges abut against an internal wall of the tubular element, and
wherein the cylindrical orifice is a threaded orifice and the single cylindrical element is a threaded cylindrical element; and
wherein an axial length of the cylindrical element is sufficiently short for the cylindrical element not to extend beyond a plane supported by the longitudinal edges of the first profiled element when it is engaged in the threaded orifice.

16. A connection device for tubular elements comprising:
a first profiled element and a second profiled element, each comprising one medial edge and two longitudinal edges;
the first and second profiled elements being joined together by their medial edges, at at least one of their respective ends, by means of a connecting part configured so as to limit the maximum travel distance between the medial edges;
the first profiled element comprising one threaded cylindrical orifice passing perpendicularly through the medial edge thereof;
a single threaded cylindrical element, having dimensions that match the threaded cylindrical orifice and arranged so as to extend beyond the medial edge of the first profiled element and abut against the medial edge of the second profiled element; and in which
the portion of the single threaded cylindrical element protruding from the medial edge of the first profiled element and abutting on the medial edge of the second profiled element defines a spatial distance between the first and second profiled elements such that the longitudinal edges abut against an internal wall of the tubular element, and
wherein the connection device comprises a compressible resilient element with a maximum height (H1) greater than the height (H2) of a triangle whose apex coincides with one of two medial edges and whose base is defined by the internal wall between the end of the longitudinal edges of the first profiled element, the compressible resilient element being inserted in an internal angle of the profiled element, or alternatively in the angle ($\alpha$) of the second profiled element.

* * * * *